(12) United States Patent
Kitani et al.

(10) Patent No.: US 7,486,599 B2
(45) Date of Patent: *__Feb. 3, 2009__

(54) RECORDING METHOD, RECORDING APPARATUS, REPRODUCING METHOD AND REPRODUCING APPARATUS

(75) Inventors: Satoshi Kitani, Tokyo (JP); Munestoshi Moriichi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/616,091

(22) Filed: Dec. 26, 2006

(65) Prior Publication Data

US 2007/0107064 A1    May 10, 2007

Related U.S. Application Data

(63) Continuation of application No. 10/339,159, filed on Jan. 9, 2003, now Pat. No. 7,173,889.

(30) Foreign Application Priority Data

Jan. 11, 2002   (JP)   ............................. 2002-005330

(51) Int. Cl.
    *G11B 7/00*    (2006.01)
(52) U.S. Cl. ................................. 369/47.13; 369/53.21
(58) Field of Classification Search .............. 369/47.13
    See application file for complete search history.

(56) References Cited

U.S. PATENT DOCUMENTS 5,694,381 A * 12/1997 Sako .................... 369/47.12

(Continued)

FOREIGN PATENT DOCUMENTS

JP        10-302393       11/1998

(Continued)

OTHER PUBLICATIONS

Jean-Paul Linnartz, et al. "System Aspects of Copy Management for Digital Video", Multimendia and expo, 2000. ICME 2000., XP010511436, vol. 1, Jul. 30, 2000, pp. 203-206.

*Primary Examiner*—Tan X Dinh
*Assistant Examiner*—Lixi Chow
(74) *Attorney, Agent, or Firm*—Oblon, Spivak, McClelland, Maier & Neustadt, P.C.

(57) ABSTRACT

In the case where data are recorded in a medium, after a specific type of a medium in which recording is performed is set, if it is detected that information is recorded on an address of specific position at which decoding information is to be located, then data at a section in which the decoding information is located are replaced with predetermined information and recording is performed. Alternatively, when data are to be reproduced from a medium, after it is discriminated that data are reproduced from a medium of a specific type, if it is determined that data are reproduced from an address of specific position at which the decoding information is to be located, then reproduction data of a section in which the decoding information is located is replaced with predetermined information and outputted. Thus, when contents data are recorded in (or reproduced from) a medium such as a recordable DVD standard, copy of data requiring copyright protection can be limited easily and reliably while a recording area of a medium is being used effectively.

20 Claims, 12 Drawing Sheets

U.S. PATENT DOCUMENTS

| | | | |
|---|---|---|---|
| 5,886,979 A * | 3/1999 | Moribe et al. | 369/47.12 |
| 5,946,279 A * | 8/1999 | Okada et al. | 369/47.45 |
| 6,009,170 A * | 12/1999 | Sako et al. | 380/201 |
| 6,347,846 B1 | 2/2002 | Nakamura | |
| 6,571,220 B1 | 5/2003 | Ogino et al. | |
| 7,173,889 B2 * | 2/2007 | Kitani et al. | 369/47.13 |
| 2002/0015369 A1 * | 2/2002 | Kobayashi | 369/53.21 |
| 2002/0048365 A1 | 4/2002 | Namiki et al. | |

FOREIGN PATENT DOCUMENTS

| | | |
|---|---|---|
| JP | 11-213548 | 8/1999 |
| JP | 2000-029791 | 1/2000 |
| JP | 2001-016195 | 1/2001 |
| JP | 2001-356063 | 12/2001 |
| JP | 2002-197787 | 7/2002 |
| JP | 2003-123401 | 4/2003 |

* cited by examiner

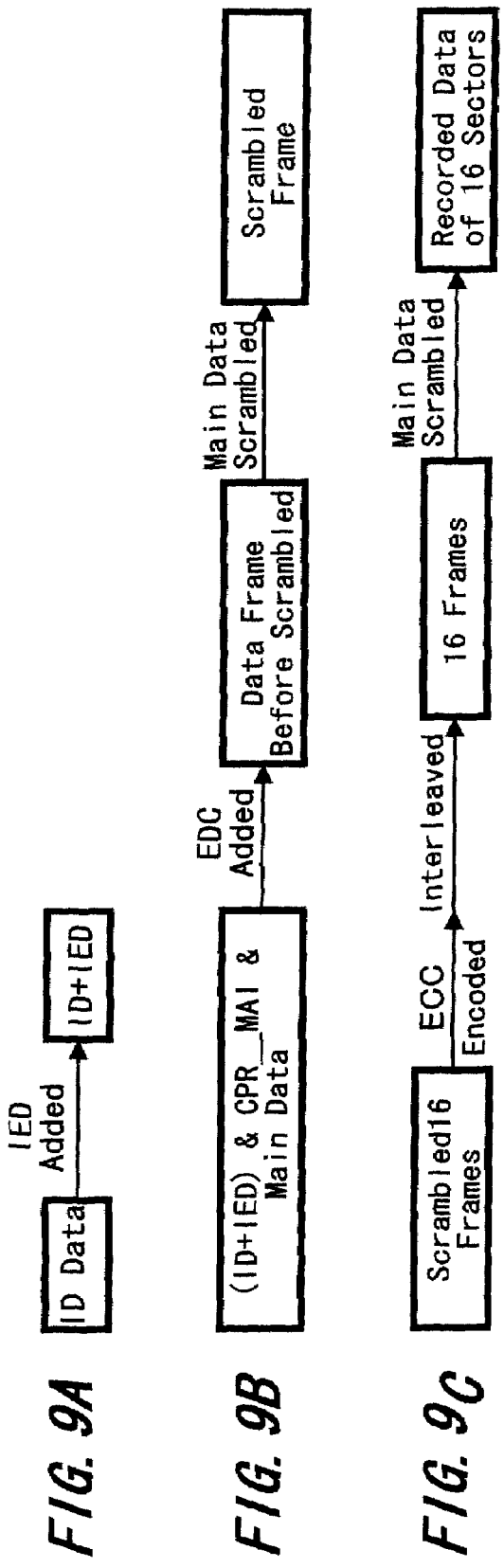

RECORDING METHOD, RECORDING APPARATUS, REPRODUCING METHOD AND REPRODUCING APPARATUS

BACKGROUND OF THE INVENTION

1. Field of the Invention

The present invention relates to a recording method, a recording apparatus, a reproducing method and a reproducing apparatus for use in recording or reproducing a disc that conforms to DVD (digital video disc or digital versatile disc) standards, for example.

2. Description of the Related Art

As media for recording contents data such as video data and audio data, media that conform to the DVD standards are now commercially available on the market. When classified from the standpoint of types of data recorded on the media, DVDs are generally classified into a DVD-video in which video data such as movies are recorded, a DVD-audio in which mainly audio data are recorded and the like.

Having classified the DVD standards from a standpoint of types of media, it is to be noted that, in addition to DVD-ROM which is the read-only type medium, there exist various kinds of media, such as DVD-R, DVD+R in which data can be recorded only once (i.e. data cannot be erased) and DVD-RW, DVD+RW, DVD-RAM in which data can be rewritten.

When contents data files are recorded on the DVD-video, the DVD-audio or the like, contents data may be encrypted and recorded on the media in view of preventing contents data recorded on the media from being used illegally. When contents data are encrypted to be recorded on a DVD standard disc, a method called a "CSS (content scrambling system)" is applied to the DVD-video, for example.

FIG. 1 is a schematic block diagram showing the CSS method applied to this DVD-video. In the case where this method is employed, a title key 2 that is an encryption key assigned to contents data file 1 such as video data and audio data is prepared. Further, there is prepared a disc key 3 that is an encryption key assigned to each disc. Then, there is provided a key issuing center 4 that manages encryption. The key issuing center 4 encrypts the disc key 3 using a master key managed by the issuing center 4 and further encrypts the title key 2 using the disc key 3.

Then, after a data compression processing unit 5 has compressed contents data 1 in accordance with MPEG (Moving Picture Coding Experts Group) encode processing, a scramble processing unit 6 scrambles contents data 1 using the title key 2 encrypted by the key issuing center 4. The encrypted contents data 1, and the disc key 3 and title key 2 encrypted at the key issuing center 4 are recorded on a disc at a disc manufacturing process 7. The disc key 3 is recorded on a lead-in area of the disc and the title key 2 is recorded on each sector of contents data having a sector structure.

Specifically, FIG. 2 shows an arrangement of a lead-in area, in the DVD, that should be first read out by the reproducing apparatus when the disc is reproduced. As shown in FIG. 2, the lead-in area uses sectors from the physical sector number is 0h (reference letter h represents the hexadecimal notation: this representation applies to the following description as well) to the sector located just before 30000h. A first area in which all values are null is followed by a sector in which a reference code is located, which is again followed by an area in which all values are null. Then, there is provided a control data area. Thereafter, there is further provided an area in which all values are null and then, from the sector number 30000h a main data area in which contents data are recorded is provided.

In the control data area, physical format information is located at the first one sector (sector 0), disc manufacturing information is located at the next one sector (sector 1) and contents provider information is located at the next 14 sectors (sectors 2 to 15). Information of these 16 sectors from the sector 0 to the sector 15 is repeatedly located in the control data area. Then, a disc key unique to the disc is located in the area in which contents provider information is located.

Then, a structure in which title key is recorded is described with reference to an example of a sector structure in FIG. 3. Each sector on which main data such as contents data are recorded is composed of 2064 bytes. Headmost four bytes of the 2064 bytes are assigned to ID data indicating the sector number and the like, and the succeeding two bytes are assigned to error-detection data for ID data. Further, the next six bytes are assigned to copyright management information (copy management data), and a title key is provided in this copyright management information. Then, 2048 bytes following the copyright management information are assigned to the main data recording area in which contents data and the like are recorded. Further, the last four bytes are assigned to error-detection data for the whole of this sector.

Fundamentally, data in a read-only disc are thus encrypted and stored using the disc key and title key. However, there are discs of DVD standards in which data can be recorded. For example, the DVD-R/RW standard disc is able to record data. Therefore, if processing so-called a bit by bit copy in which digital data reproduced from other medium is directly recorded on another medium is performed, the data read out from the DVD-video is directly recorded on the DVD-R/RW standard disc, whereby the disc of the DVD-video may be copied illegally. However, when the above-mentioned disc key and title key are prepared, contents data such as video data recorded on the illegally-copied disc cannot be decoded from encryption.

With reference to FIG. 4, there will be described the reason that contents data such as video data on the illegally-copied disc cannot be decoded from encryption. First, there is prepared a disc Da of read-only DVD-video in which the disc key and the title key are provided and recorded as described above, and this disc Da is reproduced by a user so that in a reproducing apparatus the disc key is obtained at the lead-in area of the innermost periphery of the disc and the title key is obtained from the sector in which the contents data had been recorded. Then, contents data can be correctly decoded from encryption by using the disc key and the title key obtained from this reproduction and there can be obtained decoded video data and audio data.

Assume that a user executes a bit by bit copy and records the contents data recorded on the disc Da of this DVD-video on a disc Db of a DVD-R/RW standard. In the disc Db of the DVD-R/RW standard, a part of the lead-in area is designated as an area in which data have already been recorded by pits when a disc is manufactured, and a disc key allocated to the disc Db or a dummy key has been recorded in the already-written area in advance.

Accordingly, when a user manufactures a disc Db' in which contents data read out from the disc Da of the DVD-video is directly recorded without modifying the sector structure, the copied disc Db' of the DVD-R/RW standard has a disc key including different key data compared with the original disc Da. Since the disc key is different from that of the original disc Da, even when the user intends to reproduce the copied disc Db', the reproducing apparatus is unable to correctly decode the disc key different from that applied in the manufacturing of the original disk. As a result, illegal use of the copied disc can be prevented.

Although the case where the CSS method is mainly applied to a DVD-video disc has so far been described, the fundamental principle is the same in the case where a CPPM (Content Protection for Pre-recorded) that is the scramble system applied to the disc of the DVD-audio is considered.

Now, if dummy data are recorded in advance, that is when a disc is manufactured, in the control data area of the data recordable disc in order that the disc is prevented from being written a disc key, there arises a problem of taking plenty of time and much labor to manufacture discs. Consequently, costs of manufacturing discs (media) will increase. Further, if data are recorded in advance on the lead-in area of the recordable disc, data area management information cannot be written and cannot be used for a test of writing or the like. Thus, there arises a problem that a recording area prepared for the medium cannot be utilized effectively.

From these standpoints, recording in the lead-in area also should preferably be performed by a recording apparatus when data are recorded. In future recordable discs, it is expected that their lead-in areas also can be recorded by the recording apparatus side. In the case of the medium in which data can be recorded on the whole surface of the disc, data such as DVD-video can be directly copied including those in the lead-in area. However, such arrangement is not preferable in view of protecting copyright of contents data, and hence some countermeasure should be required.

While the problems in the illegal copy control processing in the case of the DVD standard has been described so far, similar problems will arise in illegal copy control processing in media of other standards. Similar problems will also arise when media other than discs are used as recording media.

SUMMARY OF THE INVENTION

In view of the aforesaid aspect, an object of the present invention is to provide a recording method, a recording apparatus, a reproducing method and a reproducing apparatus in which illegal copy control processing can be carried out simply and reliably by effectively utilizing a recording area of a medium when contents data are recorded in the medium.

According to an aspect of the present invention, there is provided a recording method comprising the steps of: discriminating a type of a medium in which data are recorded; detecting an address at which data are recorded; replacing data at a section in which decoding information is to be located with predetermined information when the address detection step detects an address of specific position at which the decoding information is located after the discrimination step discriminated a specific type of medium in which data are recorded; and recording in the medium the data replaced by the replacement step.

According to other aspect of the present invention, there is provided a recording apparatus for recording data in a predetermined medium. This recording apparatus is comprised of: means for discriminating a type of a medium in which data are recorded; means for detecting an address at which data are recorded; means for replacing information at a section in which decoding information is to be located with predetermined information when the address detection means detects an address of specific position at which the decoding information is located after the discrimination means discriminated a specific type of medium in which information is recorded; and means for recording the data replaced by the replacement means in the medium.

According to the above-mentioned configuration, when data such as contents data are recorded in a medium, information necessary for decoding recorded data can be prevented from being recorded in the medium so that illegal use of data recorded on the medium can be prevented effectively.

According to a further aspect of the present invention, there is provided a reproducing method comprising the steps of: reproducing data from a medium; discriminating a type of the medium reproduced at the reproduction step; detecting an address at which data reproduced at the reproduction step are recorded; and replacing reproduction data at a section in which decoding information is to be located with predetermined information when the address detection step detects an address of specific position at which the decoding information is located after the discrimination step discriminated data reproduced from the specific type of medium.

In accordance with yet a further aspect of the present invention, there is provided a reproducing apparatus comprising: means for reproducing data from a medium; means for discriminating a type of the medium from which data are reproduced by the reproduction means; means for detecting an address at which data reproduced by the reproduction means are recorded; and means for replacing reproduction data of a section in which decoding information is to be located with predetermined information when the address detection means detects an address of specific position at which the decoding information is located after the discrimination means discriminated data reproduced from the specific type of medium.

According to the above-mentioned configuration, when data such as contents data are reproduced from a medium, information necessary for decoding recorded data can be prevented from being outputted so that the illegally recorded data on the medium can be effectively prevented from being used.

In accordance with still yet further aspect of the present invention, there is provided a recording method comprising the steps of: detecting an address at which data are recorded; replacing information at a section in which decoding information is to be located with predetermined information when the address detection step detects an address of specific position at which the decoding information is located; and recording data replaced at the replacement step in the medium.

According to the above-mentioned configuration, when data such as contents data are recorded in a medium, information necessary for decoding recorded data can be prevented from being recorded in the medium so that illegal use of data recorded on the medium can be prevented effectively.

In accordance with still further aspect of the present invention, there is provided a reproducing method comprising the steps of: reproducing data from a medium, detecting an address at which data reproduced at the reproduction step are recorded; and replacing reproduction data of a section at which decoding information is to be located with predetermined information when the address detection step detects an address of specific position at which decoding information is located.

According to the above-mentioned arrangement, when data such as contents data are reproduced from a medium, information necessary for decoding recorded data can be prevented from being outputted so that use of data that had been recorded on the medium illegally can be prevented effectively.

BRIEF DESCRIPTION OF THE DRAWINGS

FIGS. 9A to 9C are explanatory diagrams showing an example of encode processing required when data are recorded on a disc according to an embodiment of the present invention;

DESCRIPTION OF THE PREFERRED EMBODIMENTS

Hereinafter, embodiments of the present invention will be described with reference to the accompanying drawings.

Figure 1:
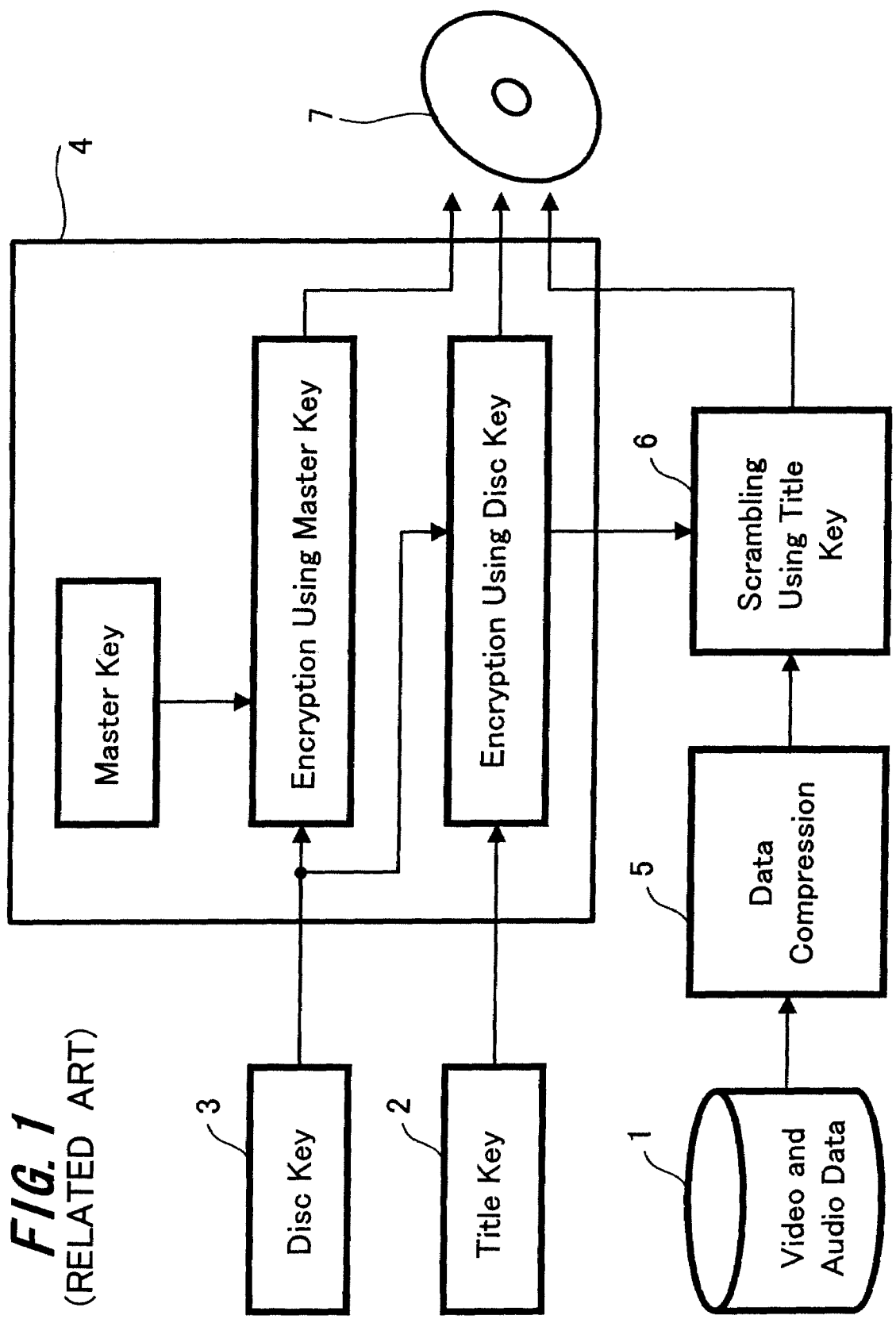
FIG. 1 is an explanatory block diagram showing an outline of encryption processing by a CSS method which can be applied to a DVD-video according to the related art.
Figure 2:
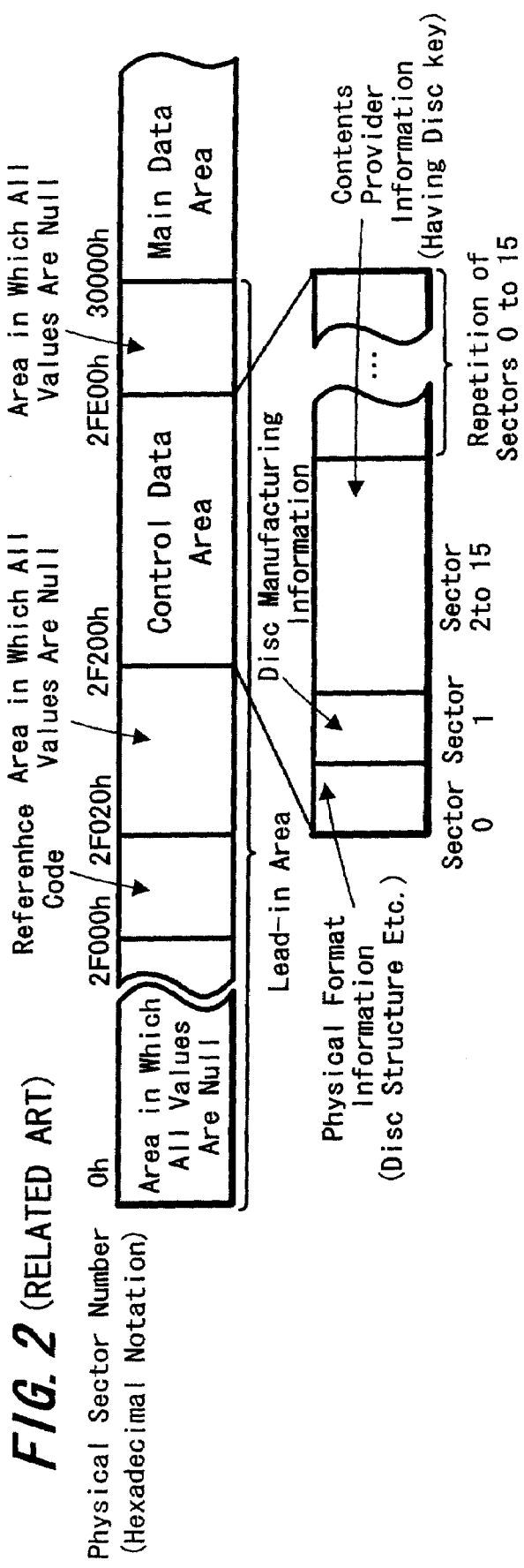
FIG. 2 is an explanatory diagram showing an example of an arrangement of a lead-in area of a DVD system according to the related art.
Figure 3:
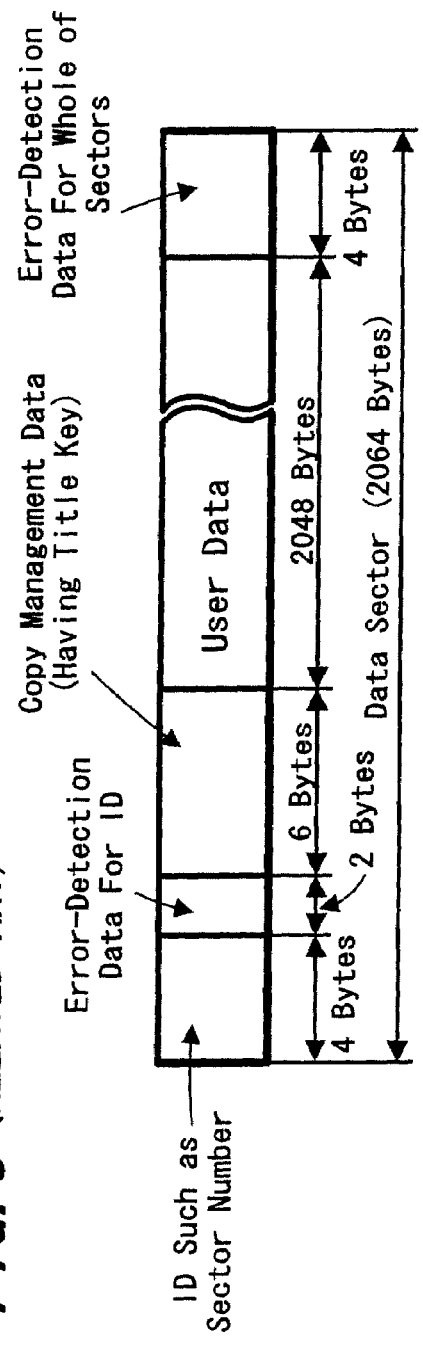
FIG. 3 is an explanatory diagram showing an example of a sector structure of a DVD system according to the related art.
Figure 4:
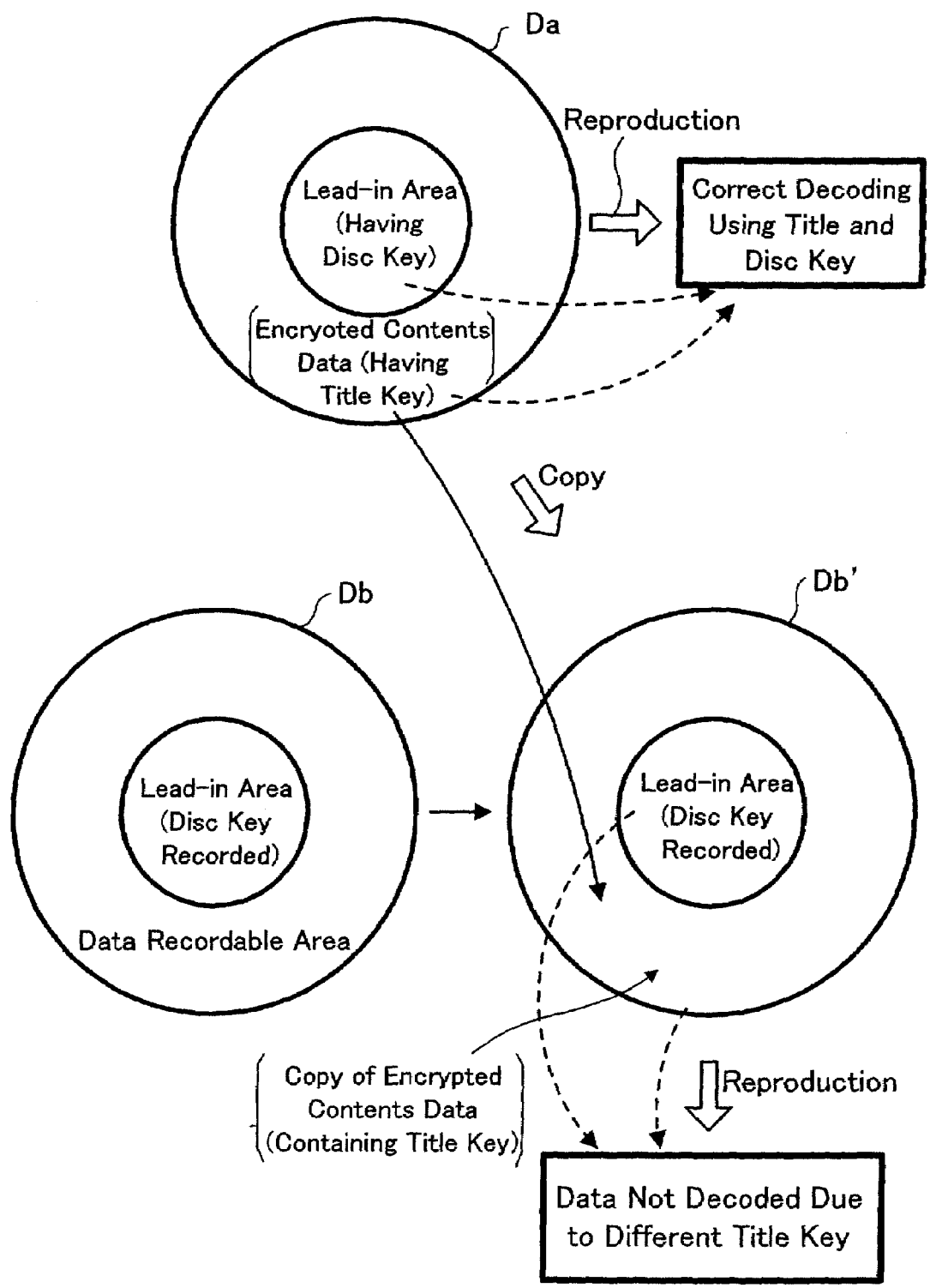
FIG. 4 is an explanatory diagram showing an example in which illegal use of a disc can be prevented by a CSS method encryption processing according to the related art.

In this embodiment, the present invention is applied to a disc drive apparatus for recording contents data on a disc-like medium or for reproducing recorded contents data from a disc-like medium. As media on which recording or reproducing can be performed by the disc drive apparatus, there may be used a DVD standard disc. In particular, as the medium in which recording is performed, there may be used a DVD+R system disc that is a medium in which data can be recorded only once and a DVD+RW system disc that is a medium in which data can be rewritten. Further, the disc drive apparatus according to this embodiment is able to reproduce a DVD-ROM disc in which data such as contents data are recorded in advance. Data that the disc drive apparatus according to this embodiment records or reproduces are recorded on the DVD standard disc and have the sector structure as shown in FIG. 3. Moreover, the lead-in area that is first reproduced when the disc is loaded onto the disc drive apparatus has the data structure in which the area with the control data being located is provided as shown in FIG. 2. Main data located at each sector may be encrypted and recorded. When main data are encrypted and recorded, there may be applied the CSS method or the CPPM method that has already been described in the related art.

Figure 5:
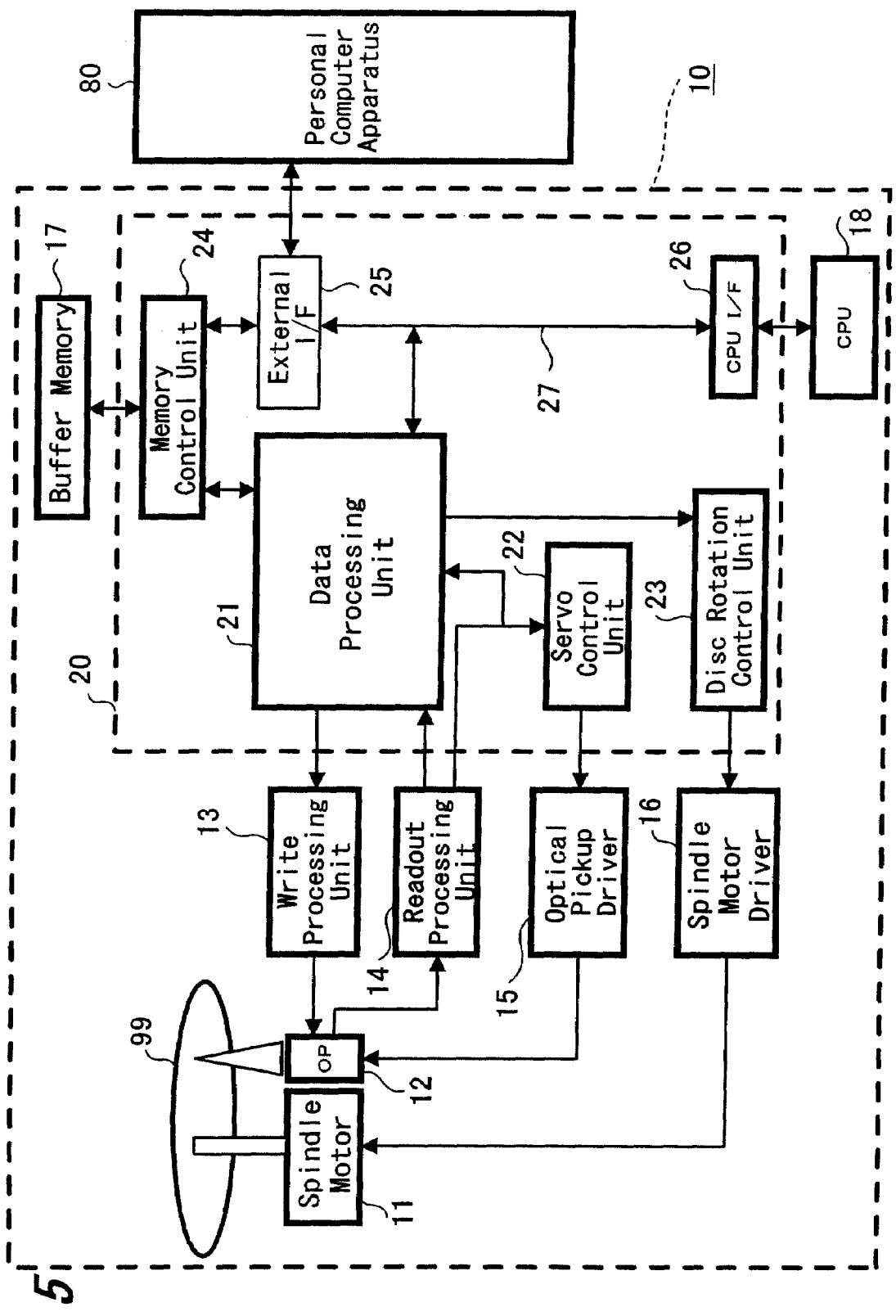
FIG. 5 is a block diagram showing an example of a disc drive apparatus according to an embodiment of the present invention.

FIG. 5 is a block diagram showing a general configuration of a disc drive apparatus according to an embodiment of the present invention. A disc drive apparatus according to this embodiment, generally depicted by reference numeral 10 in FIG. 5, is connected to a personal computer apparatus 80 (or housed within a bay or the like of computer apparatus) and used. The disc drive apparatus 10 is able to record data transmitted from the personal computer apparatus 80 on a disc which will be described below. The disc drive apparatus 10 also transmits data reproduced therein to the personal computer apparatus 80.

A disc 99 loaded on a disc tray (not shown) within the disc drive apparatus 10 is driven to rotate by a spindle motor 11. Data are recorded on the disc 99 by laser light irradiated on the signal recording surface of the disc 99 from an optical pickup (OP) 12 and data are reproduced from the disc 99 by returned laser light. Laser power is different between that for recording data and that for reproducing data.

The optical pickup 12 performs recording data on the disc 99 by a signal provided from a write processing unit 13. A signal read out from the disc 99 on reproduction by the optical pickup 12 is supplied to a readout processing unit 14 in which a signal for obtaining reproduced data and a servo control signal are obtained. The signal to obtain reproduced data (i.e. EFM plus (8/16-modulated) signal) is supplied to a data processing unit 21 within the integrated circuit 20. The servo control signals (such as focusing servo error-detection signal and tracking servo error-detection signal) are supplied to the data processing unit 21 and a servo control unit 22.

The servo control unit 22 generates servo control signals (focusing control signal, tracking control signal and sled transfer signal) by which laser light from the optical pickup 12 can follow the tracks on the disc 99. Then, the servo control unit 22 supplies these servo control signals to an optical pickup driver 15, and the optical pickup 12 is servo-controlled by a signal from the optical pickup driver 15.

When the disc 99 is driven and rotated by the spindle motor 11, a disc rotation control unit 23 generates a spindle servo signal based upon the reproduction signal supplied to the data processing unit 21 and the spindle servo signal is supplied to a spindle motor driver 16. The spindle motor driver 16 generates a rotation drive signal according to the supplied spindle servo signal, thereby driving the spindle motor 11 and the disc 99 being rotated.

Even in the case of a disc on which no information is recorded yet, wobbles of the track may be detected and the spindle motor 11 can be servo-controlled. Moreover, track address can also be detected from the wobble component.

The integrated circuit 20 further includes a memory control unit 24, an external interface unit 25 and a CPU interface unit 26 in addition to the data processing unit, the servo control unit 22 and the disc rotation control unit 23. When data are recorded on the disc 99, the data processing unit 21 functions as an encoder for encoding recorded data. Also, the data processing unit 21 functions as a decoder for decoding reproduced data when data are reproduced from the optical disc 99. Circuit arrangements around the encoder and decoder will be described later on.

The memory control unit 24 performs the control of data writing to buffer memory 17 and data reading from a buffer memory 17 connected to the outside of the integrated circuit 20. Upon recording and reproduction, data are temporarily stored in the buffer memory 17 under control of the memory control unit 24. The external interface unit 25 is able to send and receive recording data or reproduced data between itself and the personal computer apparatus 80 through a predetermined bus line. This external interface unit 25 is a standard interface used with computers and is what might be called, for example, an "ATAPI (At Attachment Packet Interface)" capable of transferring data between it and the personal computer apparatus 80. When recording data are supplied from the personal computer apparatus 80, data are transferred by a sector unit of 2048 bytes, for example, and are written in the buffer memory 17 by this sector unit.

A CPU interface unit 26 performs processing of receiving and transmitting data between a CPU (central processing unit) 18 connected to the integrated circuit 20, and circuits within the integrated circuit 20 and peripheral circuits. The CPU 18 is a control means for controlling operations of the whole of this disc drive apparatus 10. The external interface unit 25 and the CPU interface unit 26 are connected to the internal bus 27 within the integrated circuit 20 and through this internal bus 27 data transmission is performed between the external interface unit 25 and the CPU interface unit 26, and circuits within the integrated circuit 20. When recording and reproduction of data are performed, the CPU 18 may determine the type of disc loaded onto this disc drive apparatus 10 based upon track arrangement, recorded data and so on.

When data are recorded in the disc drive apparatus 10 according to this embodiment on a disc of a specific type (e.g. DVD+RW system disc) in which data can be recorded on a lead-in area, copyright management information recording areas belonging to all data in the lead-in area (or only data in a specific area within the lead-in area) are replaced with invalid data such as null data (meaningless data: dummy data) by the processing of the integrated circuit 20 that performs processing on recording data. Further, with respect to areas in which actual data such as video data are recorded, a copyright management information recording area prepared for each sector is replaced as the need arises with invalid data to be recorded. In the apparatus according to this embodiment, these controls are executed not by the CPU 18 that is the control means of the disc drive apparatus 10 but by circuits provided within the integrated circuit 20 that perform processing of recording data practically.

When the disc drive apparatus 10 according to this embodiment reproduces data from a disc of a specific type (e.g. DVD+RW system disc) in which data can be recorded on the lead-in area, copyright management information areas belonging to all data in the lead-in area reproduced from the disc (or only data in specific area within the lead-in area) are replaced with invalid data (dummy data) such as null data and transferred to the CPU 18 and the like. Further, with respect to reproduced data from the area in which actual data such as video data are recorded, reproduced data from the copyright management information recording area prepared for each sector are replaced with invalid data (dummy data) as need arises and transferred to the CPU 18 and the like. In the apparatus according to this embodiment, controls required when data are reproduced from the disc are the same as those described above. Specifically, these controls are not executed by the CPU 18 that is the control means of the disc drive apparatus 10 but by the circuits provided within the integrated circuit 20 that performs processing of reproducing data practically.

Figure 6:
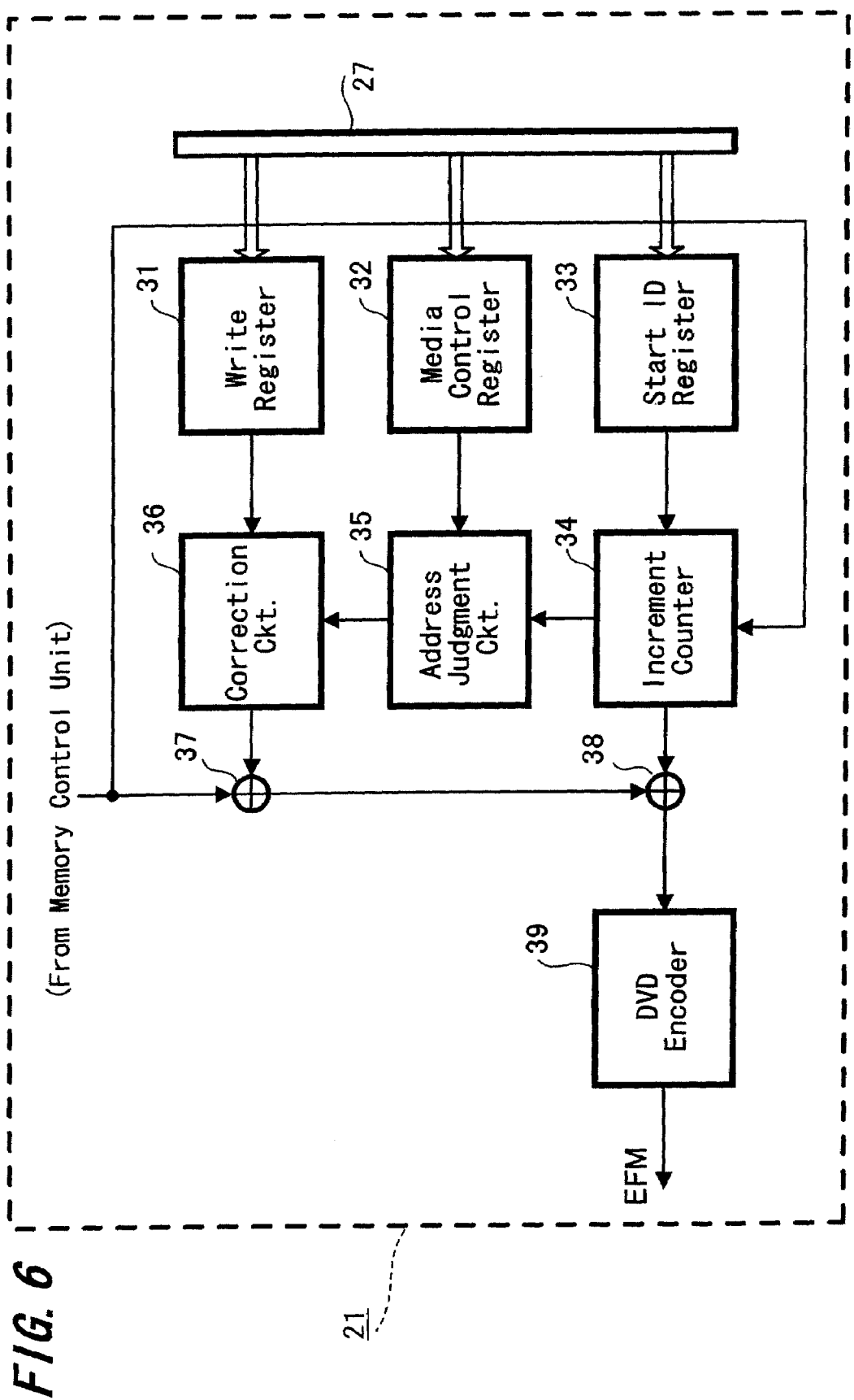
FIG. 6 is a block diagram showing an example of configuration of an encoder within a data processing unit of an apparatus according to an embodiment of the present invention.

A system configuration necessary for replacing data on the above recording and reproduction will be described below. With reference to FIG. 6, there will be described the configuration of circuits around an encoder provided in the data processing unit 21 of the integrated circuit 20 according to this embodiment.

As shown in FIG. 6, data to be recorded, which are read out from the buffer memory 17 (see FIG. 5) and transferred through the memory control unit 24 to the data processing unit 21 (see FIG. 5) are supplied to a DVD encoder 39 that functions as a DVD encoder to perform necessary data processing such as adding a error-correction code for recording, digital modulation for recording and the like.

In order to obtain the sector structure of the data to be recorded prior to the input to the encoder 39, the data processing unit 21 includes: a specific data write register 31, a media control register 32 and a start ID register 33. Necessary data are provided to these registers 31, 32 and 33 from the CPU 18 through the internal bus 27. In this specification, as the specific data there are described CPR_MAI data that represent copy management information. "CPR_MAI" is the abbreviation of the copyright management information. The value of the start ID provided to the start ID register 33 is added each time the sector address of the data to be recorded changes in an increment counter 34 and is added to the data to be recorded by a mixer 38.

The address value outputted from the increment counter 34 is judged in an address judgment circuit 35. Then, if the type of recording media (disc) set to the media control register 32 is a disc (e.g. DVD-RW system disc) of a predetermined specific type and the address judgment circuit 35 judges the address position at which specific data are located, then a correction circuit 36 corrects the value set to the data write register 31 and then the mixer 37 makes the data to be located at the portion corresponding to the data to be recorded. For example, the correction circuit 36 may correct the recorded data to provide dummy data all comprising 00h data and the mixer 37 may locate the resultant dummy data on the data to be recorded.

If the type of the disc data provided to the media control register 32 is not the specific disc type, with respect to the CPR_MAI data that is the copyright management information, the value provided to the register 31 is supplied to the mixer 37 without correcting in the correction circuit 36, thereby the value being located at the portion corresponding to the supplied data.

While the correction processing of the CPR_MAI data has been described so far, even when, for example, specific control data located at the lead-in area of the disc is corrected, such specific control data can be corrected by a similar circuit arrangement. For example, in the case where the control data area within the lead-in area has to be corrected and the control data area is detected by a similar configuration, then with respect to a corresponding area data may be corrected into dummy data and the like. The specific processing of this data correction using these circuits shown in FIG. 6 will be described later on.

Next, the configuration of circuits around a decoder provided in the data processing unit 21 of the integrated circuit 20 according to this embodiment will be described with reference to FIG. 7.

Figure 7:
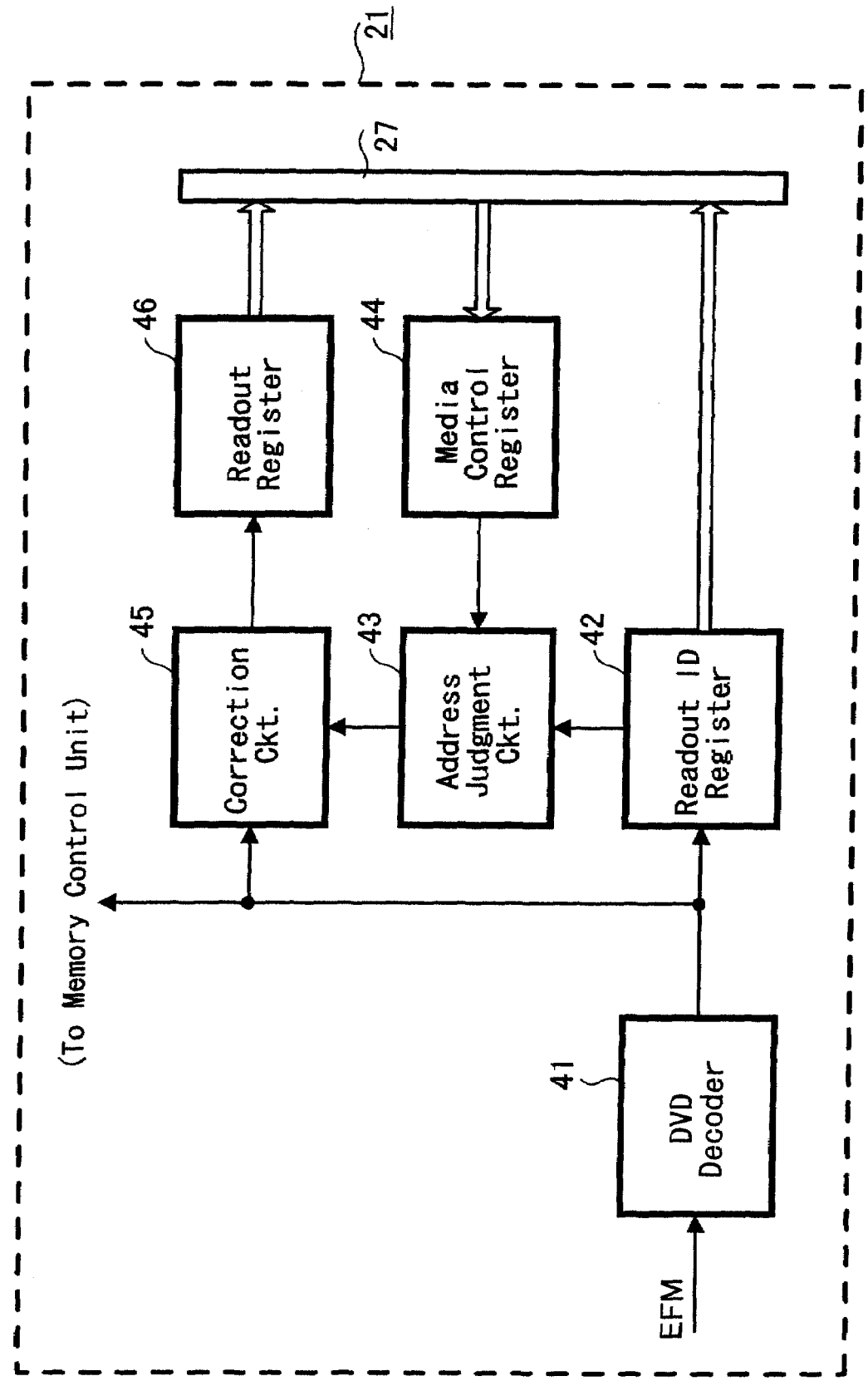
FIG. 7 is a block diagram showing an example of configuration of a decoder within the data processing unit of an apparatus according to an embodiment of the present invention.

As shown in FIG. 7, the reproduction signal (EFM signal) that had been supplied to the data processing unit 21 within the integrated circuit 20 from the readout processing unit 14 is supplied to a DVD decoder 41, in which processing such as demodulation is performed. While the reproduced data outputted from the DVD decoder 41 are temporarily stored in the buffer memory 17 through the memory control unit 24, the reproduced data are supplied to a readout ID register 42 within the data processing unit 21 and ID of the reproduced data is stored in the read ID register 21. The ID stored in the readout ID register 42 is supplied through the internal bus 27 to the CPU 18 and is also supplied to an address judgment circuit 43 which judges whether this ID is a specific address. The address judgment circuit 43 judges whether this ID is a specific address based upon the type of a reproduced media (disc) provided to the media control register 44 from the CPU 18 through the internal bus 27.

If the address judgment circuit 43 detects the specific address from the specific type of the disc (e.g. DVD+RW system disc), then a specific data correction circuit 45 corrects reproduced data of its address and data corresponding to the portion is set to a specific data readout register 46, whereafter data set to the specific data readout register 46 is supplied through the internal bus 27 to the CPU 18 and so on. In the following description, CPR_MAI data are employed as specific data. If the type of the data reproducing media (disc) provided to the media control register 44 is a disc type other than the specific type of the disc (e.g. disc of DVD-ROM in which data cannot be recorded), then data correction is not performed by the specific data correction circuit 45. The specific data contained in the reproduced data are directly provided to the readout register 46 and transferred to the CPU 18 and so forth. Based upon the thus transferred data, the CPU 18 performs necessary processing on the reproduced data. If reproduced data are encrypted reproduced data, then a disc key or a title key contained in the specific data is transferred to the personal computer apparatus 80 and the personal computer apparatus 80 decodes reproduced data using the disc key or the title key. The state of the data correction processing using the circuit arrangement shown in FIG. 7 will be described more in detail later on.

Next, the processing in which data are to be recorded on the disc by the disc drive apparatus 10 according to this embodiment will be described in detail.

Figure 8:
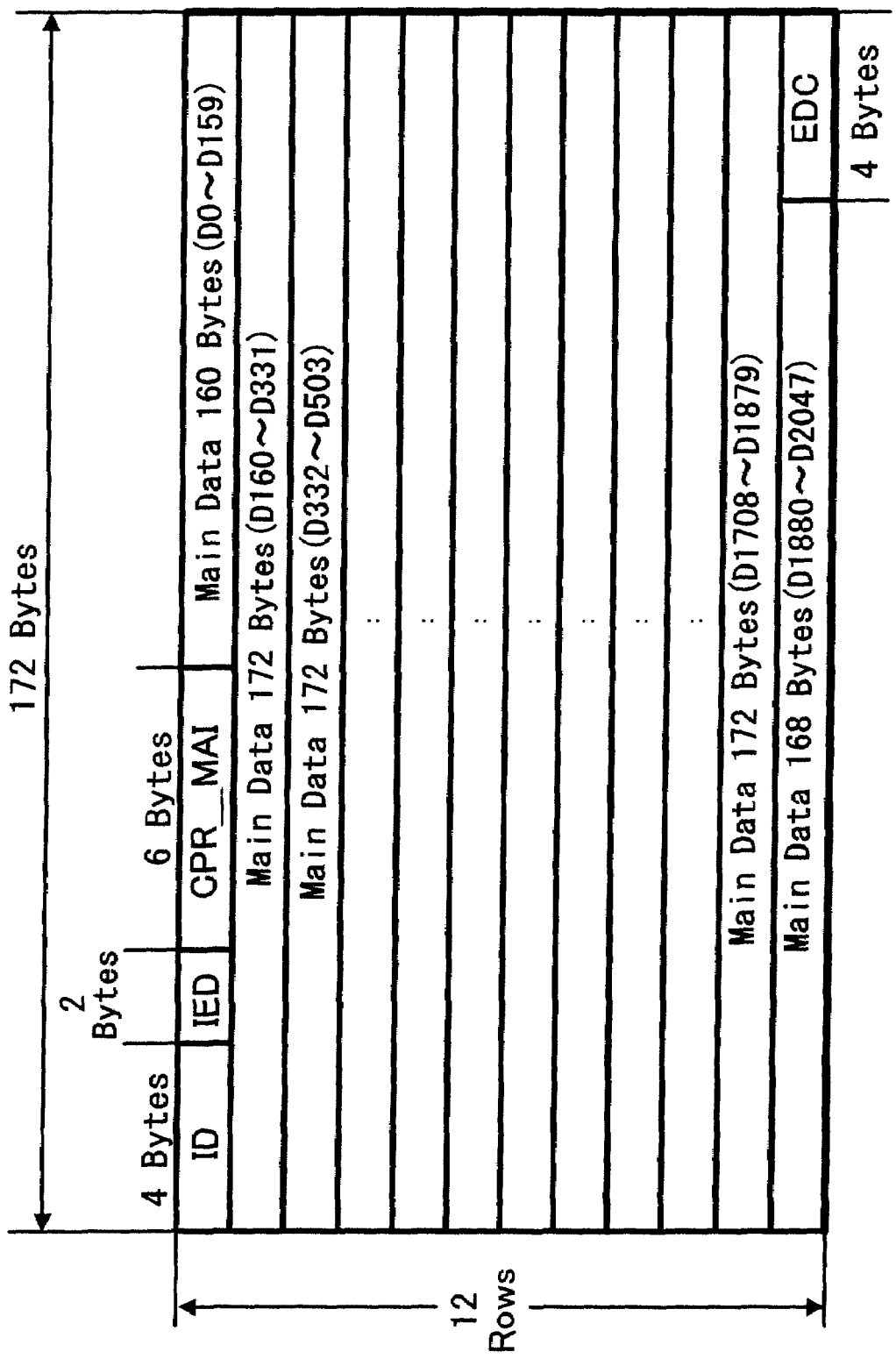
FIG. 8 is an explanatory diagram showing an example of a recording sector structure according to an embodiment of the present invention.

First, upon recording data are processed into the sector structure by the data processing unit 21 within the integrated circuit 20. The above data having the sector structure are supplied to the write processing unit 13 and processed such that the data may be recorded on the disc. FIG. 8 is a diagram showing an example of a sector structure of data that is to be recorded on the disc. FIG. 8 shows more in detail the sector structure described so far in the related-art with reference to FIG. 3. FIG. 8 shows 172 bytes as one row and one sector is composed of 12 columns of 172 bytes, that is, 2064 bytes.

As shown in FIG. 8, the first four bytes within one sector are allocated to ID that is sector address information and the next two bytes are allocated to IED that is an ID error detection code. Further, the next six bytes are allocated to an area in which the CPR_MAI data that are the copy management information is located. The CPR_MAI data recorded on this area are required when main data to be recorded require managing the copyright (copyright management). As has already been described in the related art with reference to FIG. 3, a title key necessary for decoding the main data is located in this CPR_MAI data. Then, the main data of 2048 bytes are located at the following section and the last four bytes are allocated to an area in which EDC data that is an error detection code is located. The main data area is an area in which video data, audio data and so on are located.

The CPR_MAI data are information necessary for copyright management of main data and may contain a flag or regional code indicating an encryption system used, information necessary for decoding a title key and the like, a flag indicating that necessary key data required to decode data is recorded, or information such as key data (when key data are recorded on a data area). If main data are recorded in the state in which encryption has not performed and copyright management is not required, then this CPR_MAI data are not required, and six-byte data of CPR_MAI data are replaced with dummy data such as all 00h data.

Next, the state in which the data with the sector structure shown in FIG. 8 are generated upon recording will be described with reference to FIGS. 9A to 9C. FIGS. 9A to 9C are diagrams showing the process in which the sector structure is developed.

First, as shown in FIG. 9A, there is provided ID data indicating the sector address. This ID data are calculated within the CPU 18. Specifically, while a write command is transmitted from the connected personal computer apparatus 80 to the CPU 18 upon recording, LBA (Logical Block Address) data indicating the position at which data are recorded on the disc and data indicating length of write data are added to the write command. When it is determined by the CPU 18 that contents instructed by the write command can be executed, then designated length of write data are transferred from the personal computer apparatus 80 to the buffer memory 17 and stored in the buffer memory 17 by the unit of 2048 bytes.

Before the write operation is started in actual practice, the CPU 18 calculates from the LBA data PSN (Physical Sector Number) that is a physical sector address recorded on the disc and sets the calculated value to ID data. IED data that is the error detection code are added to the ID data and six-byte data at the beginning of each sector are provided.

Then, as shown in FIG. 9B, the CPR_MAI data and the main data are added to the ID data and the IED data, and then the EDC data that is the error-detection code are generated from these data to provide data of one unit (one frame) to be scrambled. When there is provided data of one unit (one frame), the main data within data of the unit are scrambled and there is obtained scrambled one frame data set.

Further, as shown in FIG. 9C, after 16 units (16 frames) of scrambled one frame data set are collected, ECC data that is an error-correction code located within the main data are generated and interleaved 16-frame data are obtained by interleave processing in which the arrangement of 16-frame data with the ECC data added is changed. Then, physical 16-sector data are obtained by scrambling the main data within the 16-frame data thus interleaved.

Figures 10A, 10B, 10C, 10D:
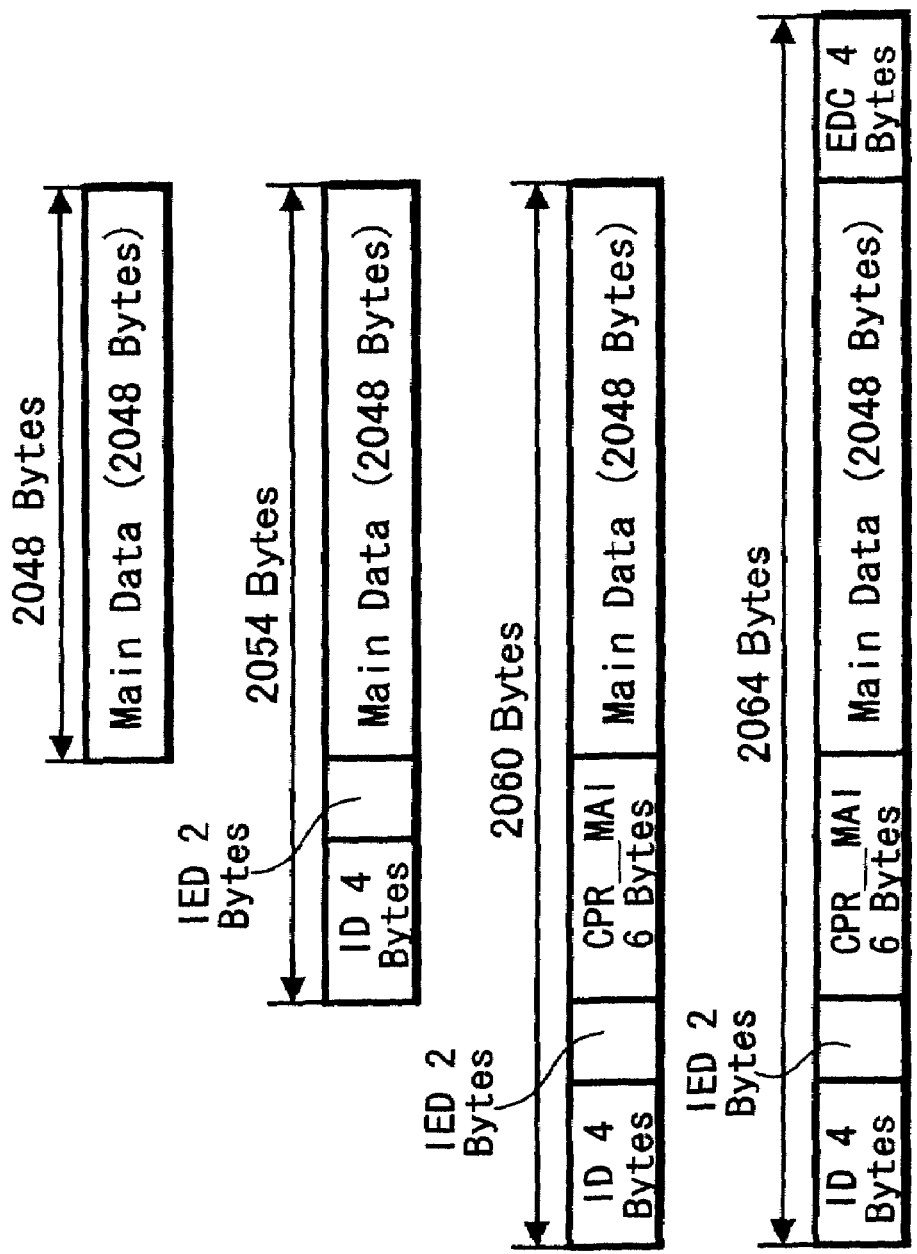
FIGS. 10A to 10D are explanatory diagrams showing an example of recording sector generation processing according to an embodiment of the present invention.

FIGS. 10A to 10D are diagrams sequentially showing the arrangement in which recording data of one sector are generated. As shown in FIG. 10A, data are transferred from the buffer memory 17 to the data processing unit 21 at the unit of 2048 bytes and the 2048-byte data are located in the main data area. Then, as shown in FIG. 10B, ID data indicating sector address and IED data that is the error-correction code of the ID data are added to every 2048-byte data as one unit. The ID data and the IED data are generated within the CPU 18 as has already been described. Further, as shown in FIG. 10C, the CPR_MAI data that is the copy management information are added to the main data. This copy management information is prepared in the CPU 18 by, for example, transferring from the connected personal computer apparatus 80. Then, as shown in FIG. 10D, the ECC data that is the error-correction code generated from all data within one sector are added.

While the recording data are constructed as described above, when the ID data and the CPR_MAI data are prepared within the CPU 18, the first set of ID data is provided to the start ID register 33 having the arrangement shown in FIG. 6 and the CPR_MAI data are provided to the specific data write register 31. The information indicating the type of the recording disc that has been judged by the CPU 18 is also provided to the media control register 32.

If a circuit for detecting a track address from a wobble component unique to a DVD+RW system disc is arranged in such a manner that the circuit can be made effective by setting the media control register 32 according to the DVD+RW system, then the CPU 18 becomes unable to record data on the DVD+RW system disc unless the CPU 18 performs setting on the media control register 32 correctly. Thus, the CPU 18 is required to perform correct control operations to make the operation more effective.

When writing of data on the DVD+RW system disc, for example, is started under the condition in which data are set to the respective registers 31, 32, 33, the CPR_MAI data set to the register 31 from the CPU 18 are forcibly corrected in the correction circuit 36 into dummy data to be located and recorded in the recording data of each sector. Accordingly, when data are recorded on the disc of the specific type such as the DVD+RW system disc using the disc drive apparatus 10 according to this embodiment, the instruction from the connected device (personal computer apparatus 80) is neglected and the dummy data are recorded on the disc as the CPR_MAI information that is the copy management information.

While in the above embodiment the CPR_MAI information at the lead-in area is replaced with the dummy data and the CPR_MAI data within each sector of the data area are replaced with the dummy data, the present invention is not limited thereto and only one of the above-mentioned CPR_MAI information may be replaced with dummy data.

Operations required when data are recorded on the disc by the disc drive apparatus 10 according to this embodiment will be described with reference to a flowchart. An example of processing required when only data at the lead-in area are all replaced with dummy data will be described with reference to a flowchart of FIG. 11.

Figure 11:
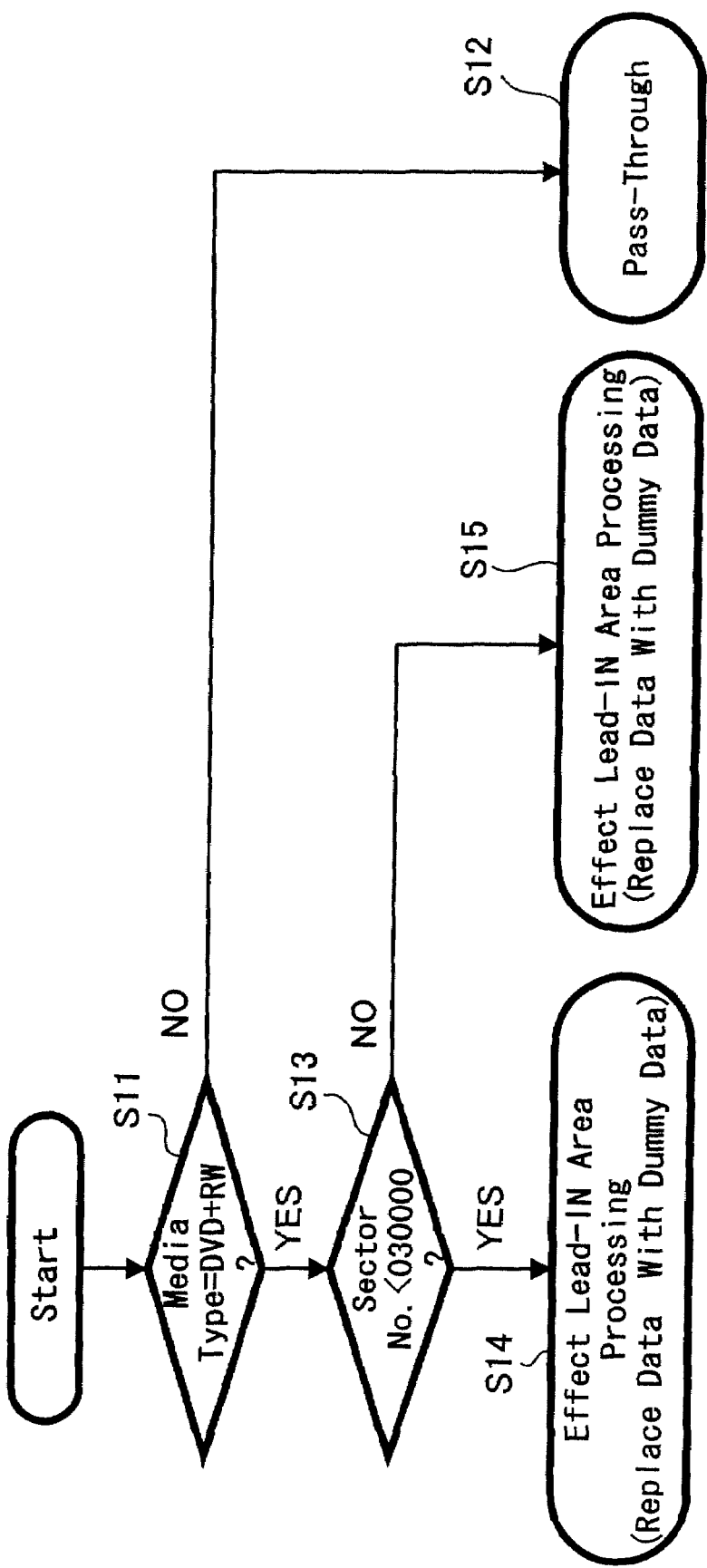
FIG. 11 is a flowchart to which reference will be made in explaining an example of processing (an example in which CPR_MAI data within a lead-in area is replaced with dummy data) according to an embodiment of the present invention.

As shown in FIG. 11, judgment of a recording address is made to start, and whether the type of the recording media is the disc of the DVD+RW type disc or not is determined in the next decision step S11. If the recording media is other recording media than the disc of the DVD+RW system as represented by NO at the decision in step S11, then operation in step S12 is performed in the so-called pass-through mode, where the recording processing instructed by the CPU 18 may be executed. If the recording media is the disc of the DVD+RW system as represented by YES at the decision in step S11, then in step S13 it is determined whether the sector number for recording is the address value less than 30000h that indicates the lead-in area. If the sector number is the address value less than 30000h as represented by YES at the decision in step S13, then in step 14 within the data processing unit 21 all of or part of CPR_MAI data in the recording data are replaced with invalid data (dummy data), which is the processing required for the lead-in area, and then recording processing is performed. If the sector number is the address value larger than 30000h as represented by NO at the decision in step S13, in the next step S15 processing required for the data area is executed. When the CSS method is applied as the encryption system, a title key is recorded in the CPR_MAI data. In step S15, the title key within the CPR_MAI data is replaced with the dummy data and then the recording processing is executed.

While all CPR_MAI data in the lead-in area are replaced with the dummy data in the processing of the flowchart shown in FIG. 11, the present invention is not limited thereto and only the CPR_MAI data in the control data area within the lead-in area may be replaced with dummy data.

Figure 12:
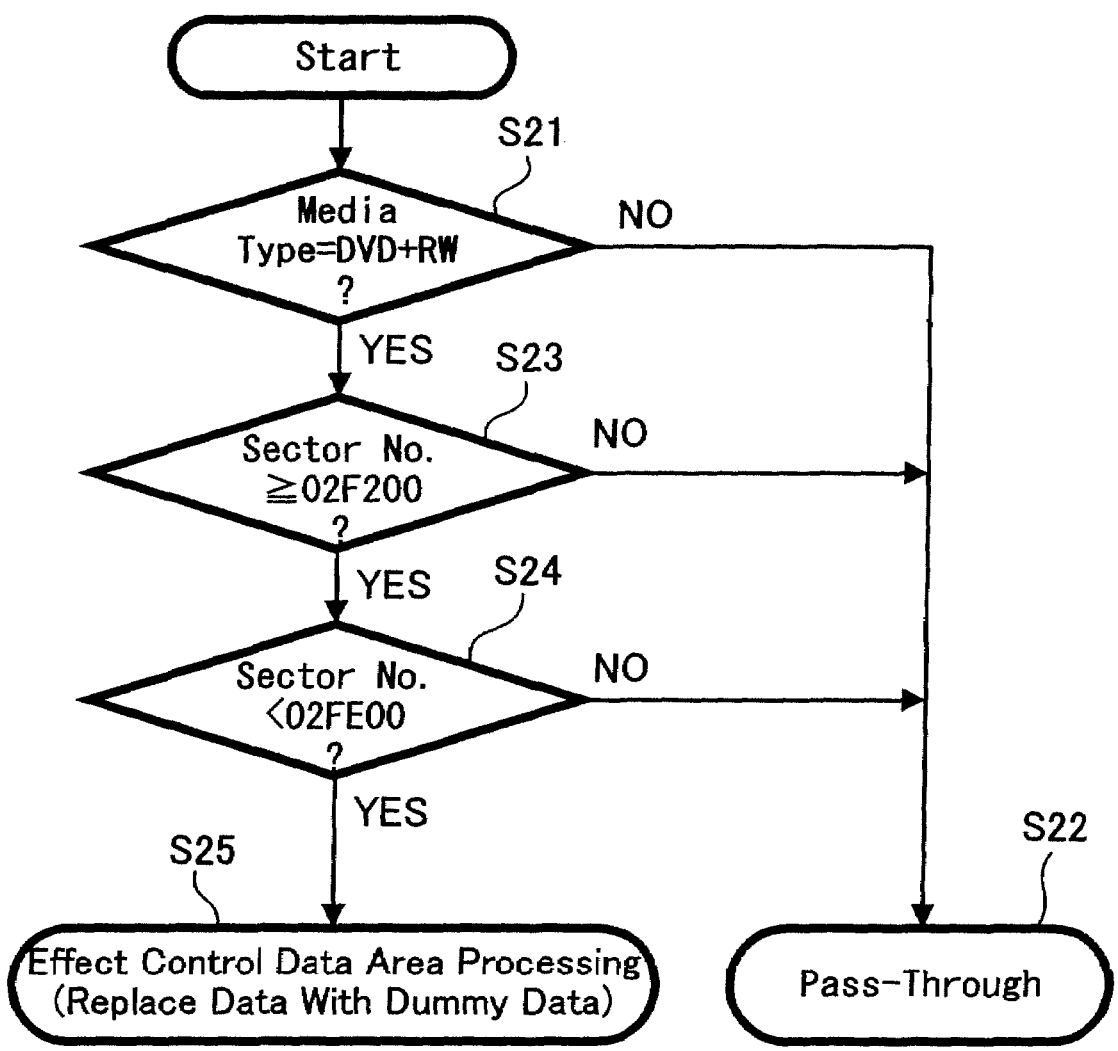
FIG. 12 is a flowchart to which reference will be made in explaining an example of processing (an example in which only data on a control data area within a lead-in area is replaced with dummy data) according to an embodiment of the present invention.

Specifically, as shown in a flowchart of FIG. 12, judgment of a recording address is made to start, and whether the type of the recording media is the disc of the DVD+RW type disc or not is determined in the next decision step S21. If the recording media is other recording media than the disc of the DVD+RW system as represented by NO at the decision in step S21, then operation in step S22 is performed in the so-called pass-through mode, where the recording processing instructed by the CPU 18 may be executed. If the recording media is the disc of the DVD+RW system as represented by YES at the decision in step S21, then in step S23 it is determined whether the sector number for recording is the address value less than 2F200h that indicates the area prior to the control data area within the lead-in area. If the sector address has the address value less than 2F200h as represented by NO at the decision in step S23, in step S22 recording is performed in the pass-through mode.

Then, if the value of the sector address becomes larger than 2F200h as represented by YES at the decision in step S23, then at the next decision step S24 it is determined whether the value of the sector address is a sector address larger than 2FE00h indicating the area following the control data area or not. If the value of the sector address is not larger than 2FE00h as represented by YES at the decision in step S24, then in step S25 recording data are judged as those in the control data area and all of or part of CPR_MAI data of the corresponding sector are replaced with invalid data (dummy data), and the recording processing is executed. If the value of the sector address is larger than 2FE00h as represented by NO at the decision in step S24, then in step S22 the recording is performed in the pass-through mode.

While only data of the lead-in area are replaced with the dummy data in the processing examples shown in the flowcharts of FIGS. 11 and 12 as described above, the present invention is not limited thereto and CPR_MAI data that is the copy management information located at the start portion of each sector other than the lead-in area may be replaced with dummy data similarly to the lead-in area. Specifically, as shown in FIG. 11, judgment of a recording address is made to start, and whether the type of the recording media is the disc of the DVD+RW type disc or not is determined in the next decision step S11. If the recording media is other recording media than the disc of the DVD+RW system as represented by NO at the decision in step S11, then operation in step S12 is performed in the so-called pass-through mode, where the recording processing instructed by the CPU 18 may be executed. If the recording media is the disc of the DVD+RW system as represented by YES at the decision in step S11, then in step S13 it is determined whether the sector number for recording is the address value less than 30000h that indicates the lead-in area. If the sector number is the address value less than 30000h as represented by YES at the decision in step S13, then in step 14 within the data processing unit 21 all of or part of CPR_MAI data in the recording data are replaced with invalid data (dummy data), which is the processing required for the lead-in area, and then recording processing is performed.

While the CPR_MAI data of each sector of the data area are replaced with the dummy data after the processing at the lead-in area has been executed as described above, the present invention is not limited thereto and the lead-in area may not processed at all (data instructed from the CPU 18 are recorded without further processing) and only the CPR_MAI data of each sector of the data area may be replaced with the dummy data. Although not shown in the figures, if writing of a disc key is detected from the CPR_MAI data, then the disc key may be replaced with the dummy data.

Next, the processing in which disc is reproduced from the disc using the disc drive apparatus 10 according to this embodiment will be described in detail.

Figures 13A, 13B, 13C:
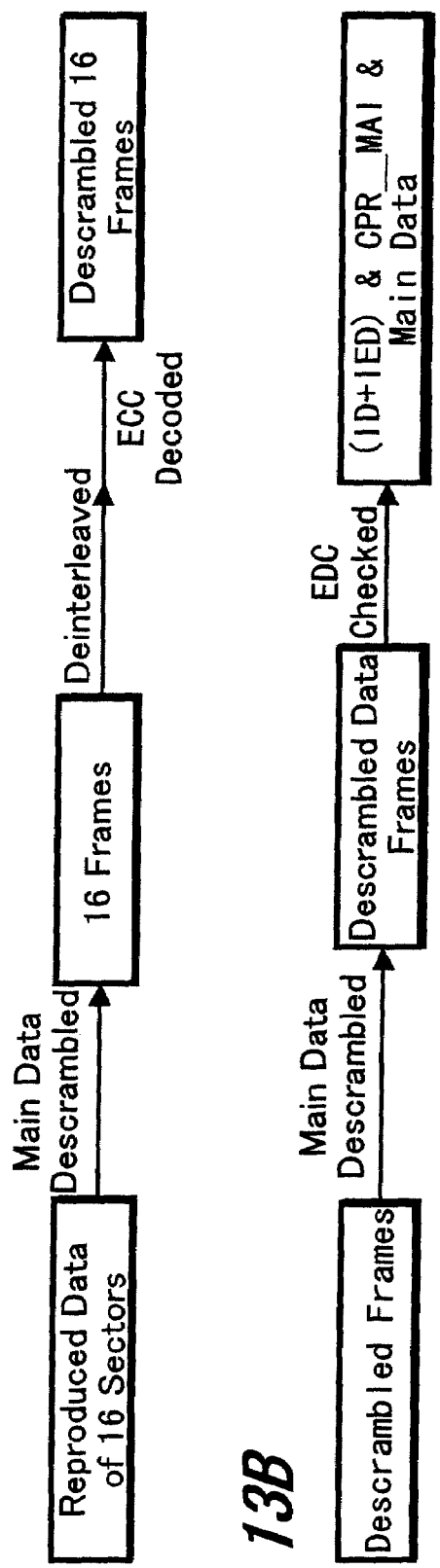
FIGS. 13A to 13C are explanatory diagrams showing an example of decode processing required when data are reproduced from a disc according to an embodiment of the present invention.

The data recorded on the disc are the data having the sector structure as heretofore noted with reference to FIG. 8 and so on, and the data having this sector structure is reproduced from the disc. An example of the state in which data having the sector structure are processed upon reproduction will be described with reference to FIGS. 13A to 13C. First, as shown in FIG. 13A, reproduced data are processed by the unit of 16 sectors. The main data within the 16-sector reproduced data are descrambled and 16-frame reproduced data are obtained. Then, the 16-frame reproduced data are de-interleaved such that the data arrangement thereof may be rearranged to obtain the original data, and decoding processing such as error correction is performed using an error-correction code to obtain descrambled 16-frame data.

Then, as shown in FIG. 13B, descrambled data frame is obtained by descrambling the main data within the descrambled data of each frame, and by performing error-check of the data frame with the ECC data, reproduced ID data, the IED data that is the error-detection code of the ID data, CPR_MAI data and the main data are obtained by the unit of each frame (sector). With respect to the ID data and IED data, as shown in FIG. 13C, correct sector address is detected by performing the error-check of the ID data using the IED data.

While data are reproduced from the disc as described above, upon reproduction when it is detected that data are reproduced from the specific type disc by the disc drive apparatus 10 according to this embodiment, within the circuit in which the reproduction processing is executed, CPR_MAI reproduced data may also be replaced with dummy data as need arises and transferred to the CPU 18 and the like that is the control means.

Specific processing may be executed in circuits relating to the processing of reproduction data within the data processing unit 21 provided in the integrated circuit 20 as shown in FIG. 7. Specifically, with respect to CPR_MAI reproduction data, for example, the address of data that are being reproduced is provided to the readout ID register 42 having the configuration shown in FIG. 7 and this address is judged by the judgment circuit 43. Moreover, information indicating the type of disc that is reproduced according to the judgment by the CPU 18 is provided to the media control register 44.

Although not shown in the figures, it may be configured that a wobble frequency unique to the DVD+RW system is detected by the data processing unit 21 and the detected results are directly provided to the media control register 44 not through the CPU 18.

When reproduction of data from the DVD+RW system disc starts under the condition that data have been set to the respective registers 42, 44 and the address of the lead-in area is judged by the address judgment circuit 43, the CPR_MAI data reproduced from this disc are forcibly corrected into dummy data by the correction circuit 45 and then provided to the readout register 46. Then, the dummy data set to the readout register 46 are supplied to the CPU 18 and the like as the reproduced CPR_MAI data. With respect to the area in which information concerning copy control within the lead-in area is reproduced, data are also forcibly corrected into dummy data by similar processing within the data processing unit 21 and transferred to the CPU 18 and the like.

Accordingly, when data are reproduced from the disc of the specific type such as that of the DVD+RW system using the disc drive apparatus 10 according to this embodiment, the CPR_MAI data that is the copy management information recorded on the disc can be prevented from being read by the CPU 18 and the like that is the control means and can also be prevented from being transferred to the connected device (personal computer apparatus 80).

These data correction processing operations required when data are reproduced from the disc are similar to those upon recording so far described with reference to FIGS. 11 and 12. Instead of correcting data to be recorded after recording address had been judged, the recorded address of the reproduced data may be judged and the necessary section of the reproduced data may be corrected.

As described above, according to the disc drive apparatus 10 of this embodiment, data are recorded on or reproduced from the disc of the predetermined type (DVD+RW system disc in the aforementioned example), whereby the processing of preventing illegal copy may function satisfactorily. Specifically, upon recording, such data as instructed from the outside can be prevented from being written in the CPR_MAI of each sector in the control data area and/or data area within the lead-in area of the disc.

Accordingly, even when there is executed processing called a bit by bit copy: in which another DVD-system disc (DVD-ROM disc), for example, including contents data encrypted and recorded is prepared and data read out from the DVD-ROM disc are recorded on the DVD+RW system disc loaded onto the disc drive apparatus 10 under instruction from the personal computer apparatus 80 connected to the disc drive apparatus 10, the CPR_MAI data in which a disc key or title key necessary for decoding the contents data is recorded are replaced with another dummy data. Therefore, even if the disc drive apparatus 10 according to this embodiment provides the DVD+RW system disc in which the contents data have been copied into the main data area, key information necessary for decoding cannot be obtained, so that encrypted recorded data cannot be decoded when the contents data are reproduced from the disc. Thus, it is possible to prevent the illegally-copied contents data from being used illegally.

On reproduction, the above-described prevention is also effected. Specifically, even if encrypted recorded contents data are reproduced from the disc of the predetermined type in which data can be recorded, data necessary for decoding the contents data can be prevented from being transmitted to the control means side of the disc drive apparatus 10 and key information necessary for decoding can be prevented from being supplied to the circuit which executes decoding. Thus, it is possible to prevent the illegally-copied contents data from being used illegally.

While the DVD+RW system disc has so far been described as an example of the disc type in which the above-mentioned processing is executed, similar processing may be executed when judged by the disc drive apparatus as a media in which copy control information can be recorded on the lead-in area. As noted in the related-art, when a disc is a data recordable disc and the area corresponding to the disc key has already been recorded by pits, for example, in a DVD+RW disc, the copy management data need not be replaced with the dummy data of this embodiment.

In this embodiment, data in the lead-in area and the like are replaced with dummy data both on recording and reproduction as described above. If data are reliably replaced with the aforementioned dummy data without fail upon recording, data cannot be reproduced from the recorded disc and the illegal use can be prevented. However, when this processing is also executed upon reproduction, even if there is loaded a disc in which the CPR_MAI data were illegally copied by another disc drive apparatus, such disc can be prevented from being reproduced illegally, and hence more reliable illegal use prevention processing can be executed.

Since data replacement processing in recording or reproduction is executed within the integrated circuit 20 which comprises the data processing unit for executing recording processing or reproducing processing so that the CPU 18 that is the control means of the disc drive apparatus 10 does not directly contribute to the data replacement processing as described above in the aforementioned embodiment of the present invention, even when the disc drive apparatus 10 according to this embodiment is illegally remodeled, information such as a disc key and title key necessary for decoding can be prevented from being leaked to the outside. Specifically, when the data replacement processing required in recording or reproduction is executed under control of the CPU 18, it is theoretically possible that the control program executed by this CPU 18 is illegally altered so that information necessary for decoding the disc key and title key provided to the disc drive apparatus may be transferred from the CPU 18 to the connected personal computer apparatus 80.

On the other hand, in the case of the disc drive apparatus 10 according to this embodiment, since the CPU 18 does not directly participate in the data replacement processing and the data replacement processing is executed by the data processing unit within the integrated circuit 20 that executes the recording processing and the reproduction processing, even when the control program of the CPU 18 or the like is altered illegally, information necessary for decoding the disc key and title key provided to the disc drive apparatus cannot be read out to the outside and hence highly-effective illegal use prevention processing can be executed. Moreover, since substantially the same illegal copy limit can be executed similarly to the case where the disc containing data recorded in advance on the lead-in area by a suitable means such as pregrooves and pits is used, media in which highly-effective illegal copy prevention is executed can be provided inexpensively. Moreover, since data can be recorded on the lead-in area of the disc, the data recordable area of the disc can be utilized effectively even in a disc in which illegal copy prevention processing can be executed satisfactorily by the drive apparatus.

When the processing of detecting the track address from the wobble component unique to the DVD+RW system disc is executed in association with the processing of setting the type of the disc to the integrated circuit 20, unless the type of the disc is set correctly, the recording processing and the reproduction processing cannot be executed correctly so that more effective illegal copy prevention can be carried out. In this case, if the wobble frequency unique to the DVD+RW system disc is detected by the data processing unit 21 within the integrated circuit 20, for example, and the detected result is directly set to the media control register 32 not through the CPU 18, then data can be processed more effectively without the external circuit such as the CPU 18 concerned at all.

While the disc drive apparatus heretofore described in the above embodiment is the disc drive apparatus connected to (or housed in) the personal computer apparatus, the present invention is not limited thereto and the present invention can certainly be applied to disc drive apparatus having other configurations. Moreover, the type of the disc that can be recorded or reproduced by the disc drive apparatus is not limited to the DVD system disc. The present invention can be applied to a recording apparatus and a reproducing apparatus for any type of media in which contents data and the like requiring copy control are similarly recorded, and media that can be recorded or reproduced may not be limited to discs. For example, when contents data are recorded (stored) in media using a semiconductor memory such as a memory card, information concerning copy control may be replaced with dummy data by similar processing.

The data construction such as the sector structure shown in the aforementioned embodiments is an example applied to the DVD system disc according to the present invention. Accordingly, the data construction of the present invention is not limited to the aforementioned embodiments. That is, since data construction to be recorded is changed in response to the type of a medium, the position of data that is to be replaced with dummy data should be altered properly.

According to the recording method and the recording apparatus of the present invention, when data are recorded on a medium, information necessary for decoding recorded data is not recorded on the medium. Thus, even when the contents data recorded on the media are reproduced, decoding cannot be executed so that the illegal use of data recorded on the media can be prevented effectively.

In this case, since the media type setting means, address detection means and data replacement means that are means for executing these controls are configured in the integrated circuit, the circuit for replacing decoding information upon recording can be integrally provided in the recording signal processing circuit. Hence, decoding information and the like need not be supplied to and processed by other circuits within the apparatus. Therefore, a possibility in which decoding information is leaked to the outside can be excluded as much as possible.

Since recorded data are encrypted contents data and decoding information is information containing decoding key data necessary for decoding the encrypted contents data, the copyright of the encrypted contents data can be protected effectively.

When the encrypted contents data are recorded, since the specific address recorded in the lead-in area of the media is detected by address detection, decoding information such as a disc key recorded in the lead-in area is lost upon recording and hence the encrypted contents data can be protected.

When the specific address is detected in the lead-in area, since the specific address is of the contents provider information area within the lead-in area, the present invention is suitable for use with a system in which decoding information is recorded on the copyright management information.

Further, in the data replacement processing, since data of copyright management information is replaced with dummy data, copyright can be effectively protected by simple processing.

Furthermore, since recorded data are the data formed as the sectors of the unit by a predetermined data amount and the address in which decoding key information of each sector is located is detected by address detection, flag indicating the disc key located at each sector of the DVD system disc or indicating that disc key is recorded on the disc can be processed so as not to be recorded on the disc when contents data are copied. Thus, copyright can be protected effectively.

According to the reproducing method and the reproducing apparatus of the present invention, when data are reproduced from the medium, if data that should not originally be recorded on the medium of such type is recorded, information necessary for decoding reproduced data can be prevented from being outputted so that data illegally recorded on the medium can be effectively prevented from being reproduced and used.

In this case, since the media type discriminating means, address detection means and data replacement means that are means for executing these controls are configured in the integrated circuit, the circuit for replacing decoding information upon recording can be integrally provided in the reproducing signal processing circuit. Hence, decoding information and the like need not be supplied to and processed by other circuits within the apparatus. Therefore, a possibility in which decoding information is leaked to the outside can be excluded as much as possible.

Since data reproduced from the medium are encrypted contents data and decoding information is information containing decoding key data necessary for decoding the encrypted contents data, the copyright of the encrypted contents data can be protected effectively.

When the encrypted contents data are reproduced, since the specific address recorded in the lead-in area of the media is detected by address detection, decoding information such as a disc key recorded in the lead-in area can be prevented from being outputted to the outside upon reproduction and hence the encrypted contents data can be protected.

Further, in the data replacement processing, since data of copyright management information is replaced with dummy data, copyright can be effectively protected by simple processing.

Furthermore, since data reproduced from the medium are the data formed as the sectors of the unit by a predetermined data amount and the address in which decoding key information of each sector is located is detected by address detection, title key located at each sector of the DVD system disc, for example, can be prevented from being outputted when data are reproduced from the illegally copied medium. Thus, copyright can be protected effectively.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A recording method comprising the steps of:
    receiving contents data and copy management information which are reproduced from a recording medium;
    detecting an address at which data relating to copy management information are recorded;
    replacing part of said copy management information with invalid data for inhibiting accurate reproduction of encrypted contents from said medium when said address is a specific position at which said copy management information is located;
    transforming said replaced invalid data into transformed data for recording data; and
    recording said transformed data for recording data and contents data in another recording medium.

2. A recording method according to claim 1, wherein data to be recorded are encrypted contents data, and said copy management information is information containing a decoding key necessary for decoding said encrypted contents data.

3. A recording method according to claim 2, wherein said address detection step is a step for detecting a specific address of a sector recorded in a lead-in area of said medium.

4. A recording method according to claim 3, wherein said specific address is an address of a sector recorded in a contents provider information area within said lead-in area of said medium.

5. A recording method according to claim 4, wherein said replacement step is a step for replacing data recorded in a copyright management information area in said contents provider information area with dummy data.

6. A recording method according to claim 2, wherein said data recorded at said recording step are data having a sector structure comprising units of a predetermined amount of data, and
    said address detection step is a step for detecting an address at which decoding key information of each sector is located.

7. In a recording apparatus for recording data on a predetermined medium, the recording apparatus comprising:
    receiving means for receiving contents data and copy management information which are reproduced from a recording medium;
    detecting means for detecting an address at which data relating to copy management information are recorded;
    replacement means for replacing part of said copy management information with invalid data for inhibiting accurate reproduction of encrypted contents from said medium when said address is a specific position at which said copy management information is located;
    transforming means for transforming said replaced invalid data into transformed data for recording data; and
    recording means for recording said transformed data for recording data and contents data in another recording medium.

8. A recording apparatus according to claim 7, wherein said address detection means and said data replacement means are configured as an integrated circuit.

9. A recording apparatus according to claim 7, wherein said data recorded in a medium by said recording means are encrypted contents data, and
    wherein said copy management information replaced by said data replacement means is information containing a decoding key necessary for decoding said encrypted contents data or a flag indicating that said decoding key is recorded.

10. A recording apparatus according to claim 9, wherein said address detection means detects a specific address of a sector recorded in a lead-in area of said medium.

11. A recording apparatus according to claim 10, wherein said specific address detected by said address detection means is an address of a sector recorded in a contents provider information area within said lead-in area of said medium.

12. A recording apparatus according to claim 11, wherein said data replacement means replaces data recorded in copyright management information area in said contents provider information area with dummy data.

13. A recording apparatus according to claim 9, wherein said data recorded by said recording means are data having a sector structure comprising
    units of a predetermined amount of data, and
    said address detection means detects an address at which decoding key information of each sector is located.

14. A reproducing apparatus comprising:
    reproduction means for reproducing data from a medium;
    receiving means for receiving contents data and copy management information which are reproduced from a recording medium;
    detecting means for detecting an address at which data relating to copy management information are recorded;
    replacement means for replacing part of said copy management information with invalid data for inhibiting accurate reproduction of encrypted contents from said medium when said address is a specific position at which said copy management information is located;
    transforming means for transforming said replaced invalid data into transformed data for recording data; and recording means for recording said transformed data for recording data and contents data in another recording medium.

15. A reproducing apparatus according to claim 14, wherein
said address detection means and said data replacement means are configured as an integrated circuit.

16. A reproducing apparatus according to claim 14, wherein
said data reproduced from a medium by said reproduction means are encrypted contents data, and
said copy management information replaced by said data replacement means is information containing a decoding key necessary for decoding said encrypted contents data.

17. A reproducing apparatus according to claim 16, wherein
said address detection means detects a specific address of a sector recorded within a lead-in area of said medium.

18. A reproducing apparatus according to claim 17, wherein
said specific address detected by said address detection means is an address of a sector recorded in contents provider information area within said lead-in area of said medium.

19. A reproducing apparatus according to claim 18, wherein
said data replacement means replaces data recorded in copyright management information area within a contents provider information area with dummy data.

20. A reproducing apparatus according to claim 16, wherein
said data reproduced by said reproduction means are data having a sector structure comprising units of a predetermined amount of data, and
said address detection means detects an address at which decoding key information of each sector is located.

* * * * *